(12) United States Patent
Fukuyama et al.

(10) Patent No.: US 7,321,703 B2
(45) Date of Patent: Jan. 22, 2008

(54) OPTICAL DEVICE

(75) Inventors: Masashi Fukuyama, Inuyama (JP); Yasunori Iwasaki, Nishikasugai-Gun (JP); Akiyoshi Ide, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/156,324

(22) Filed: Jun. 17, 2005

(65) Prior Publication Data

US 2005/0238280 A1      Oct. 27, 2005

Related U.S. Application Data

(63) Continuation-in-part of application No. PCT/JP03/16348, filed on Dec. 19, 2003, and a continuation-in-part of application No. 10/732,203, filed on Dec. 10, 2003, now abandoned.

(60) Provisional application No. 60/435,105, filed on Dec. 20, 2002.

(30) Foreign Application Priority Data

Dec. 20, 2002   (JP)   ............... 2002-370751
Jun. 2, 2003    (JP)   ............... 2003-157196

(51) Int. Cl.
    *G02B 6/12* (2006.01)
(52) U.S. Cl. ..................... 385/14; 385/129
(58) Field of Classification Search ............ None
    See application file for complete search history.

(56) References Cited

U.S. PATENT DOCUMENTS

| | | | |
|---|---|---|---|
| 4,165,496 A | 8/1979 | Di Domenico, Jr. et al. | |
| 4,756,590 A | 7/1988 | Forrest et al. | |
| 4,989,338 A | 2/1991 | Tsuji et al. | |
| 5,452,387 A | * 9/1995 | Chun et al. | ............ 385/88 |
| 5,497,438 A | 3/1996 | Ishikawa et al. | |
| 5,499,309 A | 3/1996 | Kozuka et al. | |
| 5,535,296 A | 7/1996 | Uchida | |
| 5,771,322 A | 6/1998 | Matsumoto et al. | |
| 5,793,106 A | * 8/1998 | Yasukawa et al. | .......... 257/712 |
| 5,930,423 A | 7/1999 | Chen et al. | |

(Continued)

FOREIGN PATENT DOCUMENTS

EP   0 840 150 A2   5/1998

(Continued)

OTHER PUBLICATIONS

U.S. Appl. No. 11/288,936, filed Nov. 29, 2005, Fukuyama et al.
K. Motoki et al., "Connecting Technology of Anisotropic Conductive Materials," Fujikura Giho, No. 99, Oct. 2000, pp. 32-38 (with partial translation of pertinent portion thereof).
U.S. Appl. No. 11/156,315, filed Jun. 17, 2005, Fukuyama et al.
U.S. Appl. No. 11/156,298, filed Jun. 17, 2005, Fukuyama et al.

*Primary Examiner*—Sung Pak
(74) *Attorney, Agent, or Firm*—Burr & Brown

(57) ABSTRACT

An optical device includes an optical fiber having a core and a cladding, a slit extending from the upper surface of the optical fiber into a glass substrate, a filter member inserted in the slit, and a PD array for detecting divided light. A first high-polymer gel material fills a gap between the slit and a filter member within the slit. A second high-polymer gel material is interposed between an optical fiber array and the PD array and disposed on an optical path of the light divided by the filter member.

5 Claims, 3 Drawing Sheets

U.S. PATENT DOCUMENTS

| | | | |
|---|---|---|---|
| 6,027,253 A | 2/2000 | Ota et al. | |
| 6,075,911 A | 6/2000 | Goto | |
| 6,118,915 A | 9/2000 | Sato | |
| 6,250,820 B1 | 6/2001 | Melchior et al. | |
| 6,282,352 B1 * | 8/2001 | Kato et al. | 385/92 |
| 6,304,708 B1 | 10/2001 | Fukuyama et al. | |
| 6,327,407 B1 | 12/2001 | Mitsuda et al. | |
| 6,344,248 B1 | 2/2002 | Suga | |
| 6,406,196 B1 | 6/2002 | Uno et al. | |
| 6,476,379 B2 * | 11/2002 | Ando et al. | 250/227.11 |
| 6,626,584 B2 | 9/2003 | Fujita et al. | |
| 6,784,764 B2 * | 8/2004 | Kadota et al. | 333/193 |
| 6,793,410 B2 | 9/2004 | Nakanishi et al. | |
| 6,803,639 B2 | 10/2004 | Ono et al. | |
| 6,819,840 B2 | 11/2004 | Tohgoh et al. | |
| 2001/0024553 A1 * | 9/2001 | Nakanishi et al. | 385/94 |
| 2003/0044119 A1 * | 3/2003 | Sasaki et al. | 385/49 |
| 2003/0095756 A1 | 5/2003 | Tohgoh et al. | |
| 2004/0042728 A1 * | 3/2004 | Ito et al. | 385/49 |
| 2004/0086231 A1 | 5/2004 | Fukuyama et al. | |

FOREIGN PATENT DOCUMENTS

| | | |
|---|---|---|
| EP | 0 844 503 A1 | 5/1998 |
| EP | 0 908 746 | 4/1999 |
| EP | 0 943 941 A1 | 9/1999 |
| EP | 0 994 171 A2 | 4/2000 |
| EP | 1 063 542 A1 | 12/2000 |
| EP | 1 312 960 A1 | 5/2003 |
| FR | 2 549 243 | 1/1985 |
| JP | 62-056908 | 3/1987 |
| JP | 63-191111 A | 8/1988 |
| JP | 63-205611 | 8/1988 |
| JP | 63-249118 | 10/1988 |
| JP | 01023206 A * | 1/1989 |
| JP | 64-42610 A | 2/1989 |
| JP | 2-15203 A | 1/1990 |
| JP | 2-96609 | 4/1990 |
| JP | 02-113708 | 4/1990 |
| JP | 3-103804 A | 4/1991 |
| JP | 03-271706 | 12/1991 |
| JP | 04-152306 | 5/1992 |
| JP | 04-308804 | 10/1992 |
| JP | 05-203830 A1 | 8/1993 |
| JP | 06-075137 | 3/1994 |
| JP | 6-103821 A1 | 4/1994 |
| JP | 06-331837 | 12/1994 |
| JP | 7-104146 A | 4/1995 |
| JP | 07-104148 | 4/1995 |
| JP | 7-159658 A | 6/1995 |
| JP | 07-234345 | 9/1995 |
| JP | 07-294742 A1 | 11/1995 |
| JP | 8-179128 A1 | 7/1996 |
| JP | 08-179171 | 7/1996 |
| JP | 08-213427 | 8/1996 |
| JP | 09-021912 A1 | 1/1997 |
| JP | 9-033729 A1 | 2/1997 |
| JP | 09-061664 A1 | 3/1997 |
| JP | 09-101435 | 4/1997 |
| JP | 09-105824 A1 | 4/1997 |
| JP | 9-120014 | 5/1997 |
| JP | 09-186348 A1 | 7/1997 |
| JP | 10-062660 | 3/1998 |
| JP | 10-133054 | 5/1998 |
| JP | 10-186182 | 7/1998 |
| JP | 10-227953 | 8/1998 |
| JP | 10-293219 | 11/1998 |
| JP | 10-300936 | 11/1998 |
| JP | 10-307221 A1 | 11/1998 |
| JP | 10-325917 | 12/1998 |
| JP | 11-133255 | 5/1999 |
| JP | 11-142690 | 5/1999 |
| JP | 11-248954 | 9/1999 |
| JP | 2000-009953 | 1/2000 |
| JP | 2000-249874 A | 9/2000 |
| JP | 2000-347050 | 12/2000 |
| JP | 2001-100063 A1 | 4/2001 |
| JP | 2001-102684 | 4/2001 |
| JP | 2001-513216 | 8/2001 |
| JP | 2001-264594 A1 | 9/2001 |
| JP | 2002-182051 A | 6/2002 |
| JP | 2002-343983 A1 | 11/2002 |
| JP | 2003-107301 A1 | 4/2003 |
| JP | 2003-156665 A1 | 5/2003 |
| JP | 2003-294992 A1 | 10/2003 |
| WO | 97/06458 | 2/1997 |
| WO | 02/31547 | 4/2002 |

* cited by examiner

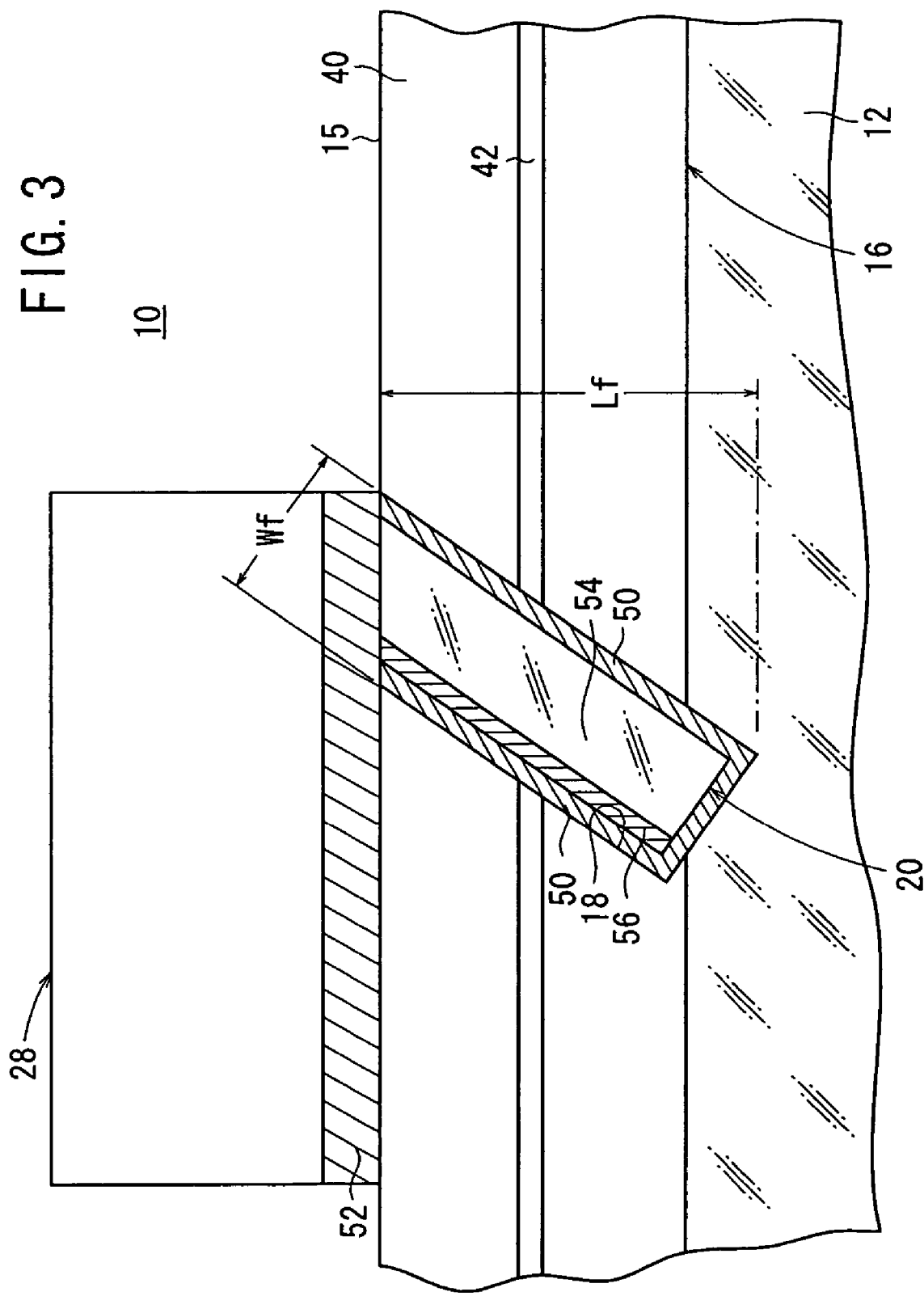

OPTICAL DEVICE

CROSS REFERENCE TO RELATED APPLICATIONS

This application is a continuation-in-part of International Application No. PCT/JP2003/016348, having an international filing date of Dec. 19, 2003, which designated. the United States, and is a continuation-in-part application of U.S. application Ser. No. 10/732,203, filed Dec. 10, 2003 now abandoned, which claims the benefit under 35 USC §119(e) of U.S. Provisional Application Ser. No. 60/435,105, filed Dec. 20, 2002, the entireties of which are incorporated herein by reference.

BACKGROUND OF THE INVENTION

1. Field of the Invention

The present invention relates to an optical fiber array having one or more optical fibers or an optical device having one or more optical waveguides, and more particularly to an optical device suitable for monitoring signal light while it is being propagated through such optical transmitting means.

2. Description of the Related Art

For the present optical communication technology, it is important to monitor communication quality. Particularly, the monitoring of optical output plays an important role in the field of the wavelength multiplex communication technology.

In recent years, there have been growing demands for smaller sizes, higher performance, and lower costs in the optical output monitoring technology.

Heretofore, there has been proposed a technology disclosed in Japanese Laid-Open Patent Publication No. 2001-264594, for example. According to the proposed technology, an optical fiber is placed in a V-shaped groove in a glass substrate, and then a parallel groove is formed obliquely (to the optical axis) in and across the optical fiber. A light reflecting base (optical member) is inserted into the parallel groove, with the gap filled with an ultraviolet-curable resin (adhesive).

Of signal light propagated through the optical fiber, a light component (reflected light) reflected by the light reflecting base is extracted out of the cladding. The reflected light is detected by a photodetector to monitor the signal light.

For connecting an optical path such as an optical fiber or the like with a low loss, there has been employed an optical fiber splicing resin or a refractive index matching material.

Generally, the optical fiber splicing resin comprises a resin having a Young's modulus ranging from several MPa to several GPa for the purpose of fixing an optical fiber in a certain position. If the optical fiber splicing resin is used as the resin that fills the parallel groove, then since the parallel groove which has a width of about several tens μm is filled with the hard resin having such a large Young's modulus, excessive stresses are developed, tending to give rise to a reliability problem, for example.

If the refractive index matching material is used as the resin that fills the parallel groove, then since the refractive index matching material is generally in a low-viscosity liquid phase, it is difficult to keep the refractive index matching material filled in the parallel groove, tending to result in a low yield.

SUMMARY OF THE INVENTION

An object of the present invention is to provide an optical device which is capable of increasing the reliability of a monitoring function to monitor signal light and increasing the yield.

According to the present invention, there is provided an optical device comprising a slit defined in light transmitting means, a filter member inserted in the slit for dividing a portion of signal light propagated through the light transmitting means, and a gel material filling the slit and having a light transmission capability. The light transmitting means may be an optical fiber, an optical waveguide, or the like.

The gel material should preferably comprise a high-polymer gel material. The high-polymer gel material refers to a low-stress high-polymer material or resin material having a Young's modulus of 1 MPa or less in a gel state. The gel state is a state wherein colloidal particles or high-polymer solutes have lost independent mobility due to their interaction and gathered, and have been solidified. A gel containing a dispersion medium and solidified is referred to as a jelly. A flowable state wherein colloidal particles are dispersed in a liquid is referred to as a sol, and the solidification of a sol is referred to as gelation.

The gel material has a very low Young's modulus. Even though the slit is filled with the gel material, it does not develop excessive stresses due to thermal variations, for example. That is, the temperature characteristics are improved, leading to an increase in the reliability of a monitoring function to monitor signal light. The gel state is generally a state between a liquid phase and a solid phase. Consequently, even though the gel material fills the slit, it is free of the problem of difficulty in retaining the shape due to flowability, which would be posed if a liquid were used. This leads to an increased yield.

The gel material should preferably have a refractive index ranging from 1.41 to 1.48. Generally, the light transmitting means such as an optical waveguide, an optical fiber, or the like has a refractive index of 1.44, and the refractive index of the gel material is close thereto. In the case where the slit is formed obliquely to the optical axis, if the refractive index of the material filling the slit deviates from the refractive index of the light transmitting means by ±0.04 or more, then the etalon effect (multiple interference) occurs between the light transmitting means and the filter member, greatly lowering the monitoring function and the propagation characteristics of the signal light. If refractive index of the gel material is in the range from 1.41 to 1.48, even though the slit is formed obliquely to the optical axis, the above etalon effect is small, preventing the monitoring function and the propagation characteristics of the signal light from being lowered.

The gel material should preferably be made of a silicone-based material. The silicone-based material is advantageous in that its refractive index thereof can easily be controlled to match the refractive index of the light transmitting means. Furthermore, the silicone-based material generally has a low humidity retaining ability, and is advantageous in that its refractive index is less liable to change due to humidity.

An optical element may be is disposed on an optical path of light divided by at least the filter member, outside of the light transmitting means, and a gel material may be interposed between the light transmitting means and the optical element and disposed on the optical path of the light divided by the filter member.

With the optical element disposed on the light transmitting means, if a filler or adhesive having a large Young's modulus is employed between the light transmitting means and the optical element, then the surface of the optical element may be damaged, or excessive stresses are developed to give rise to defects such as a shift in the optical axes of reflected light and signal light. The above problem can be avoided by interposing gel material between the light transmitting means and the optical element, as with the above arrangement. The optical element may be a PD (Photo-Diode), for example. Alternatively, an optical fiber or an optical waveguide may be provided.

If the gel material filling the slit in the light transmitting means and the gel material interposed between the light transmitting means and the optical element comprise the same material, then they are useful in improving characteristics, e.g., reducing the polarization dependent loss (PDL) of transmitted light due to the refractive index difference.

The slit should preferably have a width ranging from 15 to 50 μm. If the width is too small, then it may become difficult to insert the filter member into the slit. If the width is too large, then the insertion loss becomes larger, tending to increase the amount of attenuation of the signal light.

The slit should preferably have an angle ranging from 15° to 25° with respect to a reference plane. If the angle is too small, then the divided light from the filter member spreads too widely, resulting in increased crosstalk when the optical device is used in multichannel applications. If the angle is too large, then the divided light from the filter member has an increased polarization dependent loss, tending to result in degraded characteristics.

The filter member may have a quartz substrate and a multilayer film disposed on a principal surface of the quartz substrate. The substrate may be made of a high-polymer material (polyimide or the like), for example. If polyimide or the like is used, then the filter member may warp largely due to stresses developed by the multilayer film. Accordingly, it is desirable to make the substrate of a transparent inorganic material having a large modulus of elasticity, such as quartz or the like.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is an enlarged view showing a divider of the optical device according to the embodiment.

DESCRIPTION OF THE PREFERRED EMBODIMENTS

An embodiment in which an optical device according to the present invention is applied to a 4 channel in-line power monitor module, for example, will be described below with reference to FIGS. 1 through 3.

Figure 1:
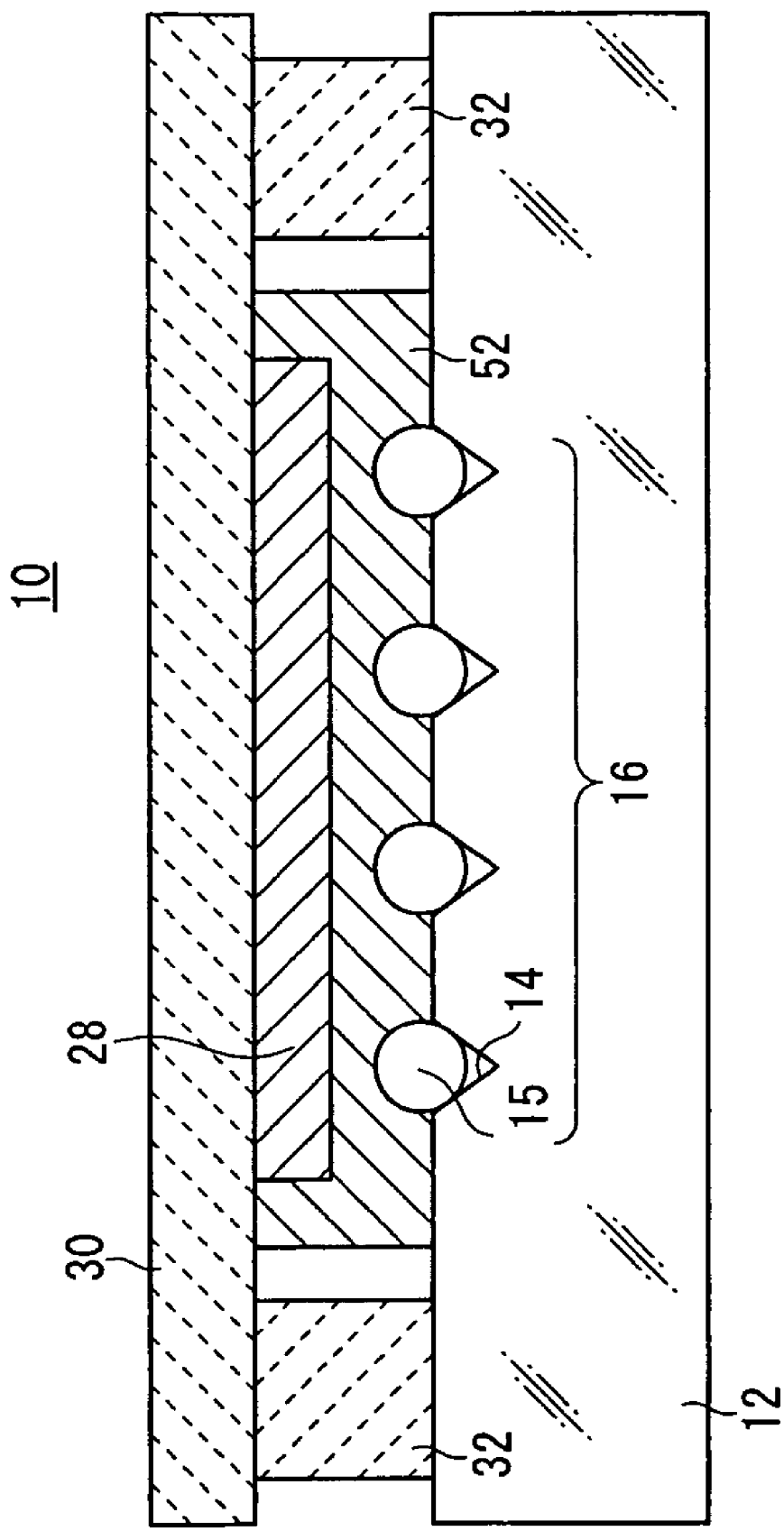
FIG. 1 is a sectional front elevational view of an optical device according to an embodiment of the present invention.

As shown in FIG. 1, an optical device 10 according to an embodiment of the present invention has a glass substrate 12, an optical fiber array 16 comprising a plurality of optical fibers 15 fixed in a plurality of V-shaped grooves 14 defined in the glass substrate 12. As shown in FIG. 2, a slit 18 extends from respective upper surfaces of the optical fibers 15 into the glass substrate 12 with a filter member 20 inserted in the slit 18 with a PD(PhotoDiode) array 28, having a plurality of active layers 26 for detecting light (divided light) 24 divided by at least the filter member 20, for detecting signal light 22 passing through the optical fibers 15, and a submount 30 fixing the PD array 28 so as to face the optical fiber array 16, and a spacer 32 for stably fixing at least the PD array 28. As shown in FIG. 2, two end faces of the slit 18 and face and reverse sides of the filter member 20 function as a divider 33 for dividing part of light 22 that passes through the optical fibers 15. As shown in FIG. 3, each of the optical fibers 15 has a core 40 and a cladding 42.

In this embodiment, the optical fiber array 16 comprises a plurality of optical fibers 15, and "each of the optical fibers 15" means "each of the four optical fibers 15". However, since even one optical fiber 15 makes up the optical fiber array 16, "each of the optical fibers" or "a plurality of optical fibers" may read as "a single optical fiber".

As shown in FIG. 3, the optical device 10 according to the present embodiment has a first high-polymer gel material 50 filling the gap between the slit 18 and the filter member 20 within the slit 18. According to the present embodiment, furthermore, the optical device 10 has a second high-polymer gel material 52 interposed between the optical fiber array 16 and the PD array 28 and disposed on the optical path of the light 24 divided by the filter member 20.

According to the present embodiment, the first and second high-polymer gel materials 50, 52 comprise the same material, i.e., a silicone-based material. Preferably, the first and second high-polymer gel materials 50, 52 have a Young's modulus of 1 MPa or less and a refractive index ranging from 1.41 to 1.48.

The Young's modulus of the first and second high-polymer gel materials 50, 52 is measured as follows: The Young's modulus is measured as a nominal Young's modulus calculated in a tensile test according to JISK6849.

The angle of the V-shaped grooves 14 defined in the glass substrate 12 should preferably be 45° or more in view of the load which will be applied to each of the optical fibers 15 of the optical fiber array 16 when the slits 18 will subsequently be formed. The angle should also preferably be 95° or less to provide a sufficient amount of adhesive (=bonding strength) in order to produce a lid-free optical fiber array. In this embodiment, the angle is 70°.

The optical fiber array 16 is fixed to the glass substrate 12 by placing the optical fiber array 16 in the V-shaped grooves 14, applying an ultraviolet-curable adhesive, and then applying an ultraviolet radiation from the reverse side of the optical fiber array 16 and from above the optical fiber array 16 to cure the adhesive.

The slit 18 should desirably have a width Wf (see FIG. 3) in the range from 15 to 50 μm. If the width Wf is too small, then it may become difficult to insert the filter member 20 into the slit 18. If the width Wf is too large, then the insertion loss becomes larger, tending to increase the amount of attenuation of the signal light 22.

The slit 18 should desirably have a depth Lf in the range from 130 μm to 250 μm. If the depth Lf is too small, then since the bottom of the slit 18 may possibly be located within the optical fibers 15, the optical fibers 15 may possibly suffer damage starting from the bottom of the slit 18. If the depth Lf is too large, then it is not preferable because it invites a reduction in the mechanical strength of the glass substrate 12.

The tilt angle α (see FIG. 2) of the slit 18, i.e., the angle between the slit 18 and the vertical plane, should preferably range from 15° to 25°. If the tilt angle α is too small, then the divided light 24 from the filter member 20 spreads too widely, resulting in increased crosstalk when the optical device is used in multichannel applications. If the tilt angle α is too large, then the divided light 24 from the filter member 20 has an increased polarization dependent loss, tending to result in degraded characteristics.

The filter member 20 comprises a quartz substrate 54 and a dividing multilayer film 56 disposed on a principal surface of the quartz substrate 54. In view of easy handling of the filter member 20, the filter member 20 may be made of a plastic material, a high-polymer material, or a polyimide material. However, since the tilt angle α of the slit 18 is large, i.e., it is in the range from 15° to 25°, the filter member 20 should preferably be made of a material having the same refractive index as the optical fibers 15 (quartz) in order to prevent the optical axis of transmitted light from being displaced due to refraction.

Figure 2:
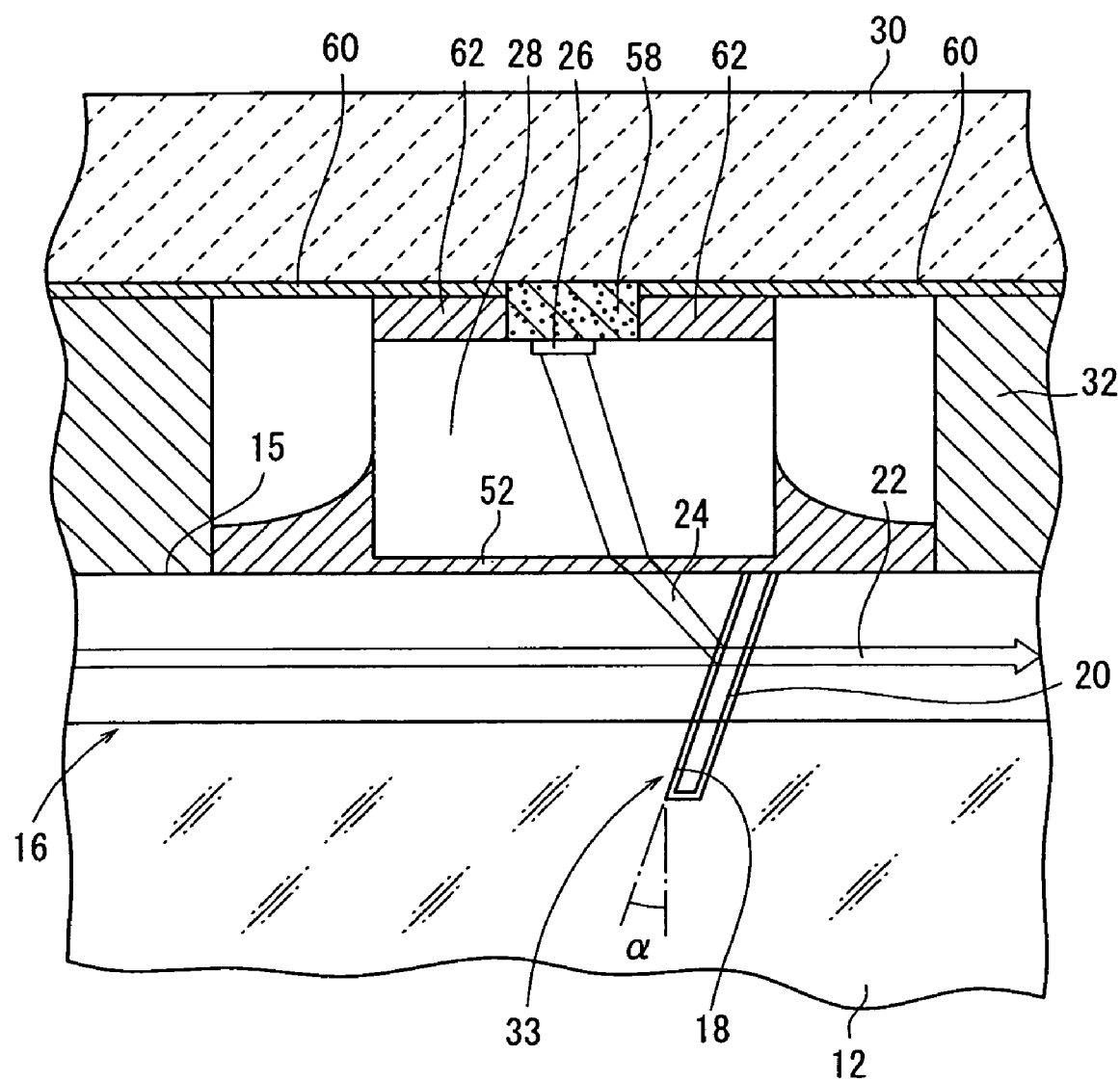
FIG. 2 is a sectional side elevational view of the optical device according to the embodiment.

As shown in FIG. 2, the PD array 28 is of a structure for detecting light applied to its reverse side. An anisotropic conductive paste 58, rather than a gold solder or electrode or a silver paste, is disposed on an upper surface of the active layer 26 (which faces the submount 30). From the standpoint of crosstalk, the region on the upper surface of the active layer 26 should preferably be of a material having low reflectance, such as the anisotropic conductive paste 58, air, or the like, rather than a material having high reflectance, such as gold or the like. The PD array 28 may be a PD array for detecting light applied to its face side.

The photodetector area (active layer 26) of the PD array 28 for detecting light applied to its reverse side has a diameter of about 60 μm. The diameter of the photodetector area (active layer 26) should preferably be in the range from 40 to 80 μm. If the diameter is smaller than 40 μm, then since the size of the photodetector area (active layer 26) is too small, the efficiency with which the PD array 28 detects light is lowered. If the diameter is equal to or greater than 80 μm, then the PD array 28 tends to detect stray light, resulting in increased crosstalk.

A light-shield mask (not shown) of gold is disposed on the surface of the PD array 28. Specifically, the surface of the PD array 28 is covered with a film of gold, which is removed only from an area where the divided light 24 is applied. If the PD array 28 is designed for detecting light applied to its reverse side, then the central position of the area from which the film of gold is removed is offset about 50 μm from the photodetector area of the PD array 28. This is because the divided light 24 is applied obliquely to the PD array 28 in the present embodiment, so that the beam position on the surface of the PD array 28 is different from the beam position on the photodetector area of the PD array 28. The light-shield mask should desirably be of a diameter ranging from 30 μm to 100 μm. If the diameter of the light-shield mask is smaller than 30 μm, then the amount of light is limited as the aperture is too small. If the diameter of the light-shield mask is greater than 100 μm, then crosstalk characteristics become poorer as light tends to leak into adjacent channels. The light-shield mask may be of a circular shape, but should more preferably be of an elliptical shape. The elliptical shape has a major axis extending in the direction in which the divided light 24 travels. This is because the light spot of the divided light 24 divided by the divider 33 is of an elliptical shape in the position of the light-shield mask according to the present embodiment.

The submount 30 is mounted in a structure which has the optical fiber 15, the PD array 28, and the submount 30 that are arranged successively. If the submount 30 is mounted in a structure which has the optical fiber 15, the submount 30, and the PD array 28 that are arranged successively, then since the submount 30 is present between the optical fiber 15 and the PD array 28, the length of the optical path of the divided light 24 is increased, and the divided light 24 is spread greatly, posing disadvantages with respect to the efficiency with which the PD array 28 detects light and crosstalk. The submount 30 is made of $Al_2O_3$.

The PD array 28 for detecting light applied to its reverse side has anode and cathode electrodes disposed on its active layer 26 side (facing the submount 30). A common cathode electrode and anode electrodes of respective channels are patterned as an electrode pattern 60 of gold on the submount 30. Bumps 62 of gold are disposed in areas corresponding to the anode and cathode electrodes of respective channels, and the region on the active layer 26 is filled with the anisotropic conductive paste 58. The bumps 62 of gold serve the purpose of achieving reliable conduction and also the purpose of increasing the inter-electrode distance between the active layer 26 and the submount 30 to reduce stray light due to reflection and scattering in the areas. When heat is applied to the anisotropic conductive paste 58, a conductive material such as silver or the like in the anisotropic conductive paste 58 is attracted to the conductive areas such as the bumps 62 of gold, thereby providing conductivity only between the anisotropic conductive paste 58 and the electrode pattern 60 of gold.

The area of the lower surface of the submount 30 which corresponds to the active layer 26 is coated with SiN (not shown) for reducing reflection due to the refractive index difference. The surface of the PD array 28 is also coated with a multilayer film of SiN, $Al_2O_3$, Tao, etc. in order to reduce a polarization dependent loss due to the refractive index difference.

The spacer 32 for determining the gap between the optical fiber array 16 and the PD array 28 is fixed to the mounting surface of the submount 30 by an ultraviolet-curable adhesive, for example.

In the optical device 10 according to the present embodiment, as described above, the gap between the slit 18 and the filter member 20 within the slit 18 is filled with the first high-polymer gel material 50. The high-polymer gel material has a very low Young's modulus of 1 MPa or less. Therefore, the first high-polymer gel material 50 filling the slit 18 does not develop excessive stresses due to thermal variations, for example. That is, the temperature characteristics are improved, leading to an increase in the reliability of a monitoring function to monitor the signal light 22. Moreover, the first high-polymer gel material 50 is in a gel state, i.e., in a state between a liquid phase and a solid phase. Consequently, even though the first high-polymer gel material 50 fills the slit 18, it is free of the problem of difficulty in retaining the shape due to flowability, which would be posed if a liquid were used. This leads to an increased yield.

In the case where the slit 18 is formed obliquely to the optical axis according to the present embodiment, if the refractive index of the material filling the slit 18 deviates from the refractive index of the optical fibers 15 by ±0.04 or more, then the etalon effect (multiple interference) occurs between the optical fibers 15 and the filter member 20, greatly lowering the monitoring function and the propagation characteristics of the signal light 22. According to the present embodiment, since the refractive index of the first high-polymer gel material 50 is in the range from 1.41 to 1.48, even though the slit 18 is formed obliquely to the optical axis, the above etalon effect is small, preventing the monitoring function and the propagation characteristics of the signal light 22 from being lowered.

According to the present embodiment, because the first high-polymer gel material 50 comprises a silicone-based material, the refractive index thereof can easily be controlled to match the refractive index of the optical fibers 15.

Furthermore, the first high-polymer gel material 50 has a low humidity retaining ability, its refractive index is less liable to change due to humidity.

If a filler or adhesive having a large Young's modulus is employed between the optical fiber array 16 and the PD array 28, then a thin film (of SiN or the like) formed on the surface of the PD array 28 may be damaged, or excessive stresses are developed to give rise to defects such as a shift in the optical axes of the divided light 24 and the signal light 22.

According to the present embodiment, however, as the second high-polymer gel material 52 having a Young's modulus of 1 MPa or less is interposed between the optical fiber array 16 and the PD array 28, the above problem can be avoided.

Furthermore, inasmuch as the first and second high-polymer gel materials 50, 52 comprise a silicone-based material, they are useful in improving characteristics, e.g., reducing the polarization dependent loss (PDL) of transmitted light due to the refractive index difference.

An inventive example of the optical device 10 according to the present embodiment will be described below. First, a glass substrate 12 for use in an in-line optical fiber array 16 was fabricated by a grinding process.

The glass substrate 12 was made of borosilicate glass (particularly, Pyrex (registered trademark) glass material was used). The glass substrate 12 had a size represented by a length of 16 mm and a thickness of 1 mm. 12 V-shaped grooves 14 for holding the optical fiber array 16 were formed at a pitch of 250 µm to a depth of about 90 µm by a grinding process.

Then, the optical fiber array 16 was assembled. The optical fiber array 16 comprised a 12-core ribbon fiber having a pitch of 250 µm. The tape was peeled off from the 12-core ribbon fiber to provide a peeled region having a length of 12 mm, and the optical fibers were placed in the V-shaped grooves 14 in the glass substrate 12 and fixed in place by an ultraviolet-curable resin adhesive.

Then, the slit 18 was formed in and across the optical fiber array 16. The slit 18 had a width Wf of 30 µm, a depth Lf of 200 µm, and a tilt angle α of 20°.

Then, the filter member 20 was fabricated. The multilayer film 56 made of $SiO_2$, $TiO_2$, $Al_2O_3$, for example, was formed on the quartz substrate 54 by evaporation, and the quartz substrate 54 with the multilayer film 56 formed thereon was machined into a chip having a size of 6 mm×2 mm. The quartz substrate 54 in the form of the chip was polished into a thin plate having a thickness of 25 µm. The thin plate had a designed tilt angle of 20°, a division ratio represented by a transmittance of 93% and a reflectance of 7%.

Thereafter, the filter member 20 was inserted into the slit 18, and the gap between the slit 18 and the filter member 20 within the slit 18 was filled with the first high-polymer gel material 50, installing the filter member 20 in place.

Thereafter, the PD array 28 was mounted on the submount 30. The PD array 28 had 12 channels, and had a height of 150 µm, a width of 420 µm, and a length of 3 mm.

The PD array 28 had a structure for detecting light applied to its reverse side, as with the optical device 10 according to the present embodiment. The area above the active layer 26 (which faces the submount 30) was filled with the anisotropic conductive paste 58.

Then, the PD array 28 was centrally aligned. Specifically, the spacer 32 for determining the gap between the optical fiber array 16 and the PD array 28 was installed on the submount 30.

The spacer 32 was made of borosilicate glass, particularly Pyrex (registered trademark) glass material. The gap length was set to 10 µm. Since the thickness of the PD array 28 including the bumps 62 of gold was 190 µm, the spacer 32 had a thickness of 200 µm.

Then, the upper portions of the optical fibers 15 serving as the optical path of the divided light 24 were coated with a required mount of second high-polymer gel material 52. The PD array 28 was aligned by active alignment to maximize the power of the divided light 24 detected by the PD array 28 (the power of the divided light 24 detected by the active layer 26 corresponding to the channels at the opposite ends of the optical fiber array 16) when light is applied to the channels at the opposite ends of the optical fiber array 16. The power of the divided light 24 detected by the PD array 28 was monitored by observing an output current from the active layer 26 corresponding to the channels at the opposite ends of the optical fiber array 16, with a probe applied to the submount 30. Thereafter, the PD array 28 is secured to the optical fiber array 16 by ultraviolet radiation. The optical device according to the present embodiment was completed at this time. Finally, the optical device according to the present embodiment was placed in a package and formed as a product.

The optical device according to the inventive example was evaluated for measurements. The polarization dependent loss of the divide light 24 had a good value of 0.3 dB or less, and changes in the light detection efficiency due to temperature changes were of good values of 0.2 dB or less. The optical device according to the inventive example exhibited good long-term reliability even after the elapse of 1000 hours in a heat test which was conducted at a temperature of 85° C. and a humidity of 85%.

The optical device according to the present invention is not limited to the above embodiment, but may have various arrangements without departing from the scope of the invention.

What is claimed is:

1. An optical device comprising:
   a slit defined in light transmitting means, wherein said slit has a width ranging from 15 µm to 50 µm and an angle ranging from 15° to 25° with respect to a reference plane;
   a filter member inserted in said slit for dividing a portion of signal light propagated through said light transmitting means, said filter member comprising a quartz substrate and a multilayer film disposed on a principal surface of said quartz substrate; and
   a silicone-based gel material filling said slit and having a light transmission capability, wherein said gel material has a refractive index ranging from 1.41 to 1.48 and a Young's modulus of 1 MPa or less.

2. An optical device according to claim 1, wherein an optical element is disposed on an optical path of light divided by at least said filter member, outside of said light transmitting means; and
   a second gel material is interposed between said light transmitting means and said optical element and disposed on said optical path of said light divided by said filter member.

3. An optical device according to claim 2, wherein said gel material filling said slit in said light transmitting means and said second gel material interposed between said light transmitting means and said optical element comprise the same material.

4. An optical device according to claim 1, wherein said light transmitting means comprises an optical fiber.

5. An optical device according to claim 1, wherein said slit has a depth ranging from 130 µm to 250 µm.

* * * * *